(12) United States Patent
Verma et al.

(10) Patent No.: US 9,510,384 B2
(45) Date of Patent: Nov. 29, 2016

(54) PRE-ASSOCIATION CONTENT DISCOVERY

(71) Applicant: QUALCOMM Incorporated, San Diego, CA (US)

(72) Inventors: Lochan Verma, San Diego, CA (US); Vijayalakshmi Rajasundaram Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 35 days.

(21) Appl. No.: 14/625,192

(22) Filed: Feb. 18, 2015

(65) Prior Publication Data

US 2016/0073438 A1 Mar. 10, 2016

Related U.S. Application Data

(60) Provisional application No. 62/048,147, filed on Sep. 9, 2014.

(51) Int. Cl.
| | |
|---|---|
| *H04W 76/02* | (2009.01) |
| *H04W 48/16* | (2009.01) |
| *H04W 48/14* | (2009.01) |
| *H04L 29/08* | (2006.01) |
| *H04W 84/12* | (2009.01) |
| *H04W 8/00* | (2009.01) |
| *H04W 48/18* | (2009.01) |

(52) U.S. Cl.
CPC .......... *H04W 76/023* (2013.01); *H04L 67/141* (2013.01); *H04L 67/16* (2013.01); *H04W 48/14* (2013.01); *H04W 48/16* (2013.01); *H04W 8/005* (2013.01); *H04W 48/18* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 8,817,662 B2 | 8/2014 | Mahaffy et al. | |
| 2011/0149806 A1* | 6/2011 | Verma ................. | H04L 12/2809 370/255 |
| 2012/0099476 A1 | 4/2012 | Mahaffy et al. | |
| 2013/0294434 A1 | 11/2013 | Lee | |
| 2014/0016569 A1 | 1/2014 | Chen et al. | |
| 2014/0016628 A1 | 1/2014 | McCann et al. | |
| 2014/0120829 A1 | 5/2014 | Bhamidipati et al. | |
| 2014/0277937 A1 | 9/2014 | Scholz et al. | |
| 2016/0019785 A1* | 1/2016 | Zhang ............... | G01C 21/3423 340/905 |

OTHER PUBLICATIONS

International Search Report and Written Opinion from International Application No. PCT/US2015/049100, dated Jan. 8, 2016, 10 pp.

(Continued)

*Primary Examiner* — Anh Ngoc Nguyen
(74) *Attorney, Agent, or Firm* — Shumaker & Sieffert, P.A.

(57) ABSTRACT

A first computing device includes: a memory storing instructions; and at least one processor. The at least one processor is configured to: establish a connection with a second computing device, responsive to initiating the connection, perform content discovery with the second computing device; and establish a session of a service responsive to performing content discovery.

28 Claims, 10 Drawing Sheets

(56) References Cited

OTHER PUBLICATIONS

Response to Written Opinion dated Jan. 8, 2016, from International Application No. PCT/US2015/049100, filed on Jun. 30, 2016, 6 pp.

IEEE Standards Association, "Part 11: Wireless LAN Medium Access Control (MAC) and Physical Layer (PHY) Specifications: Amendment : Interworking with External Networks", IEEE Computer Society, IEEE Std 802.11Utm-2001, Feb. 25, 2011, 208 pp.

* cited by examiner

Metadata of Content/Media

Properties of an Object

1. Type
2. Subtype
3. Size
4. Duration
5. name
6. Protection
7. Width
8. Height
9. Encoding Quality
10. Video Bitrate
11. Composer
12. Artist
13. Genre
14. Copyright Information
15. Language
16. Date added
17. Date last accessed
18. Rating
19. Track
20. Parental Rating
21. Subtitle
22. Album Name
23. DRM Status
24. Audio Bitdepth
25. Number of Channels
26. SampleRate
27. Audio Bitrate
28. Hidden

Content Discovery Messages

Content Discovery Query Message

| Field Name | Size (Octet) | Value | Description |
|---|---|---|---|
| OUI Subtype | 0x09 | 0x09 | WFA OUI subtype |
| Content Update Indicator | variable | variable | The content update indicator is a counter that is incremented when a change has occurred in the service information of the device sending the Content Discovery Query or Response frame. |
| Content TLV | variable | variable | See Content TLV table 2 |

FIG. 8A: Content Discovery Vendor-Specific Content

| Field Name | Size (Octet) | Value | Description |
|---|---|---|---|
| Length | 2 | Variable | Length of the Content Request TLV |
| Content Type | 1 | See FIG. 8C | Content Type |
| Content Transaction ID | 1 | Variable | Content transaciton ID is a non-zero value used to match the Content Request/Response TLVs |
| Query Data | Variable | NA | Query data for the requested content information |

FIG. 8B: Content Request TLV

| Value | Meaning |
|---|---|
| 0 | All Content Types |
| 1 | Audio |
| 2 | Video |
| 3 | Image |
| 4 | Productivity |
| 5 | Script |
| 6-254 | Reserved |
| 255 | Vendor Specific |

FIG. 8C: Content Type

| Value | Description |
|---|---|
| 0 | All Protocol Types |
| 1 | Bonjour |
| 2 | UPnP |
| 3 | WS-Discovery |
| 4 | Wi-Fi Display |
| 5-10 | Reserved |
| 11 | Peer-to-peer services |
| 12 | Content Discovery-Audio |
| 13 | Content Discovery-Video |
| 14 | Content Discovery-Image |
| 15 | Content Discovery- Productivity |
| 16 | Content Discovery-Script |
| 17 | Content Discovery all Content Type |
| 18 - 254 | Reserved |
| 255 | Vendor Specific |

FIG. 8D: Content Type Indicating Services

Content Discovery Response Message

| Field Name | Size (Octet) | Value | Description |
|---|---|---|---|
| OUI Subtype | 0x09 | 0x09 | WFA OUI subtype |
| Content Update Indicator | variable | variable | The content update indicator is a counter that is incremented when a change has occurred in the service information of the device sending the Content Discovery Query or Response frame. |
| Content TLV | variable | variable | See Content TLV table 4 |

FIG. 9A: Content Discovery Vendor-Specific Content

| Field Name | Size (Octet) | Value | Description |
|---|---|---|---|
| Length | 2 | Variable | Length of the Content Request TLV |
| Content Type | 1 | See FIG. 9D and FIG. 8D | Content Types |
| Content Transaction ID | 1 | Variable | Content transaciton ID is a non-zero value used to match the Content Request/Response TLVs |
| Status Code | 1 | See FIG. 9C | Status code for the requested content information |
| Response Data | Variable | NA | Response data is dependent on the requested content information type in Query Data field of the Content Request |

FIG. 9B: Content Response TLV

| Value | Meaning |
|---|---|
| 0 | Success |
| 1 | Content Type Unavailable |
| 2 | Requested Information Unavailable |
| 3 | Bad Request |
| 4-255 | Reserved |

FIG. 9C: Status Code

| Value | Meaning |
|---|---|
| 0 | All Content Protocol Types |
| 1 | Audio |
| 2 | Video |
| 3 | Image |
| 4 | Productivity |
| 5 | Script |
| 6-254 | Reserved |
| 255 | Vendor Specific |

FIG. 9D: Content Type

PRE-ASSOCIATION CONTENT DISCOVERY

This application claims priority to U.S. Provisional Application No. 62/048,147, filed on Sep. 9, 2014, the entirety of which is incorporated by reference herein.

TECHNICAL FIELD

The disclosure relates to establishing a communication link between wireless computing devices.

BACKGROUND

Wireless computing devices may use various wireless protocols, such as Wi-Fi Direct (WFD) to detect other wireless devices and to form a wireless communication link with other WFD-compatible devices without using a wireless access point. Once the wireless computing devices establish a wireless communication channel, wireless devices may advertise services to other wireless devices using WFD or another protocol over the wireless communication channel. The wireless devices may also seek services using WFD or another protocol. Wireless devices may then establish a session to an advertised or discovered service, and may communicate using the service over the established session for the service.

SUMMARY

In general, this disclosure relates to techniques for enabling pre-association content discovery between wireless devices, such as smartphones, laptops, tablets, desktops, e-book readers, and/or head units of an automobile. By performing pre-association content discovery, wireless-enabled computing devices may avoid wasteful and unnecessary connection setup and teardown of various protocols. Pre-association content discovery may also improve the ability of a user to select media accessible to various computing devices within wireless communication range of each other. Additionally, pre-association content discovery may improve user experience by providing additional functionality and information related to media accessible computing devices, e.g. at an automobile head unit.

In one example in accordance with the techniques of this disclosure, a method includes establishing, by a first computing device and to a second computing device, a connection with the second computing device, responsive to initiating the connection, performing, by the first computing device and with the second computing device, content discovery, and establishing a session of a service responsive to performing content discovery.

In one example in accordance with the techniques of this disclosure, a first computing device includes a memory and at least one processor. The at least one processor may be configured to: establish a connection with a second computing device, responsive to initiating the connection, content discovery with the second computing device, and establish a session of a service responsive to performing content discovery.

In another example in accordance with the techniques of this disclosure, an first computing device comprises: means for establishing, to a second computing device, a connection with the second computing device, means for performing, by the first computing device and with the second computing device, content discovery responsive to initiating the connection, and means for establishing a session of a service responsive to performing content discovery.

In another example in accordance with the techniques of this disclosure, a non-transitory computer-readable storage medium includes instructions stored thereon that, when executed, cause at least one processor to: establish a connection with a second computing device, responsive to initiating the connection, perform content discovery with the second computing device, and establish a session of a service responsive to performing content discovery.

The details of one or more examples of the disclosure are set forth in the accompanying drawings and the description below. Other features, objects, and advantages will be apparent from the description and drawings, and from the claims.

BRIEF DESCRIPTION OF DRAWINGS

FIG. 5 is a table and associated descriptions illustrating content information metadata in accordance with the techniques of this disclosure.

FIGS. 8A, 8B, 8C, and 8D are tables illustrating a more detailed format of a Content Discovery Query message in accordance with the techniques of this disclosure.

FIGS. 9A, 9B, 9C and 9D are tables illustrating fields and corresponding values for a Content Discovery Response message in accordance with the techniques of this disclosure.

DETAILED DESCRIPTION

Figure 1:
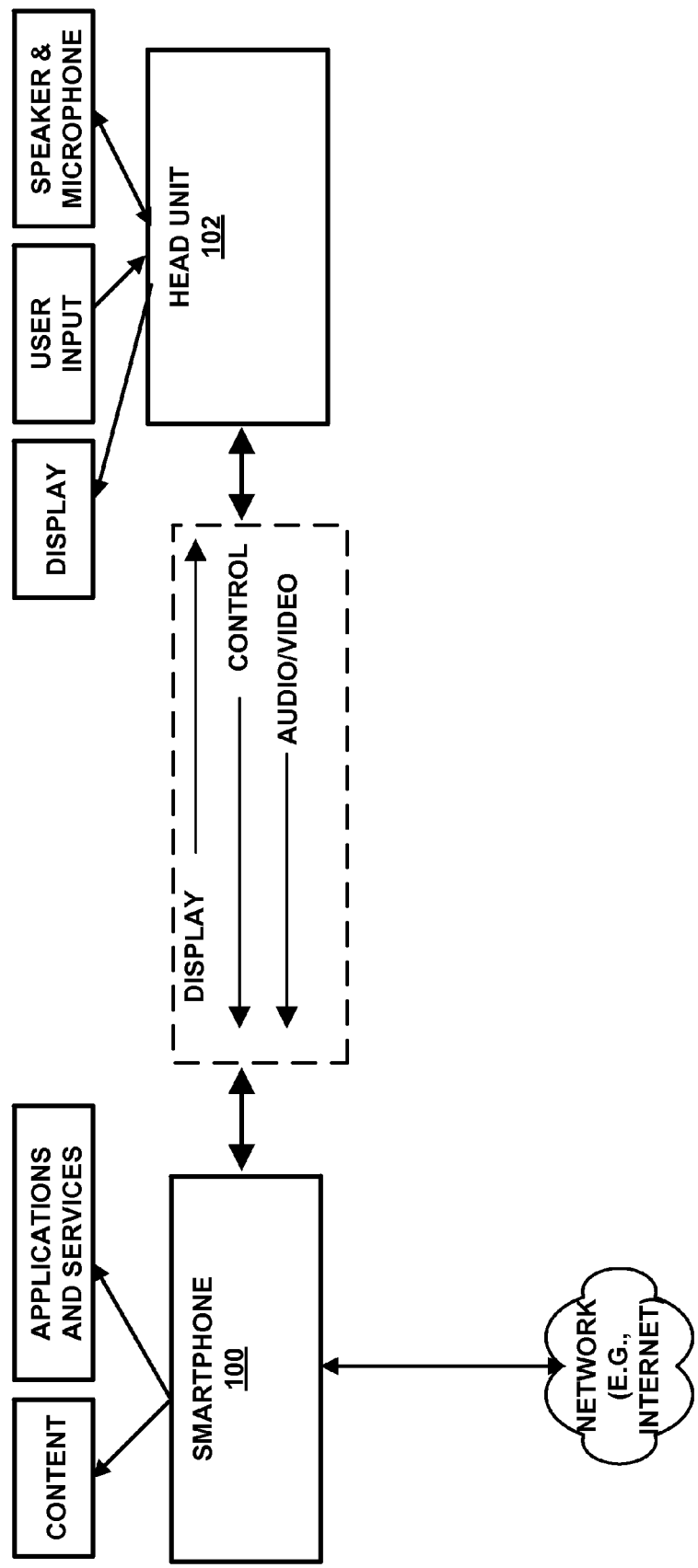
FIG. 1 is a block diagram illustrating a link between a smartphone and a head unit 102.

This disclosure describes techniques for performing pre-association content discovery among wireless devices before establishing a session using various wireless protocols. In cases, example wireless devices may include an automobile head unit that is part of an in-vehicle infotainment system (IVI), and one or more wireless devices that are operable to wirelessly communicate with the automobile head unit.

When a first computing device comes within range of a second wireless-enabled device, the first computing device may use a protocol, such as Wi-Fi Direct (WFD) to discover the second device. WFD operates using the IEEE (Institute for Electrical and Electronics Engineers) 802.11 suite of protocols, commonly referred to as "Wi-Fi." A device configured to use WFD sends 802.11 frames over specific Wi-Fi frequency bands, referred to as "channels" in an effort to communicate and discover other WFD-enabled devices.

If the first device discovers the second WFD-enabled computing device, the first and second devices may establish an OSI (Open Systems Interconnection) Layer 2 (L2) connection. The two devices may optionally exchange information about services that the device seeks from the other device or offers to the other device. Responsive to establishing an L2 connection, the first and second computing devices may form a wireless group, and may "associate" with each other. After the first and second computing devices associate with each other, the devices may establish a session for a particular service. Examples of such services may include Wireless Serial Bus (WSB) and MirrorLink™ (ML), as two non-limiting examples.

WSB and ML are two examples of protocols that allow a first computing device to share content with a second computing device. Currently however, a first and second computing device must establish a WSB session or an ML session before being able to view media that another device is sharing. The session setup process can be lengthy, and can consume significant resources (e.g., random access memory (RAM), central processing unit (CPU) time, and/or battery power), which may result in a poor user experience.

This disclosure describes techniques for pre-association content discovery. Pre-association content discovery allows wireless-enabled devices to transmit information associated with one or more content items before establishing a session for a service. A content item may comprise a file, for example a media item, such as an audio or video file, a presentation, or any other file type. A media item may also comprise a stream, or any other type of data capable of being transmitted between computing devices or storage devices. A computing device configured in accordance with the techniques of this disclosure may be configured to associate content information with a content item. Examples of content information will be described in greater detail below.

As an example, there may be multiple MirrorLink™ server devices (e.g., smartphones, tablets, laptops, wearable computers, e-readers) in communication range with a head unit of an automobile. Each server device may have access (e.g., store and/or have access via the Internet) to different content items, such as content items stored on a storage device of the client device or content accessible via a network or a storage device. A user of the head unit may wish to be able to browse through the available media on each of the devices before selecting one of the devices with which to setup an ML session. According to the current ML and WSB standards, the head unit must establish a session of the ML or WSB protocol with each of the server devices to determine information about the content accessible to each of the server devices.

As another example, smartphones may discover the head unit, e.g., using WFD, as described above. The smartphones and head unit may exchange device and service information, e.g., using WFD or another protocol. A user may manually initiate link setup between the smartphones and the head unit by manual selection. In this example, a user may only be able to view content on the head unit after a user manually triggers each of the smartphones to setup between the smartphones and the head unit. After a user selects one device based on its accessible content, the head unit and the non-selected smartphones may dissolve the links between the smartphones and the communication links between the devices. In both of the aforementioned examples, the overhead of creating sessions and the engagement with devices that are eventually dissolved or not used wastes computing resources.

In some examples, the techniques of this disclosure can avoid unnecessary overhead of session setup and device association by enabling wireless computing devices to perform content discovery prior to the devices associating with each other, a technique referred to as "pre-association content discovery." In one example accordance with the techniques of this disclosure, one or more smartphones (or other wireless-enabled computing devices) may discover another wireless device, such as a head unit. The smartphones and head unit may exchange device and service information. The smartphones may exchange media and/or content meta-data (referred to as "content information") with the head unit.

Responsive to receiving the content information, the head unit may output, and for display, at least some of the received content information. A user may select one of the smartphones based on the outputted content information. After the user selects a smartphone based on the content information available to the head unit, the head unit and the selected smartphone may associate with each other and perform session setup. The other smartphones do not perform protocol session setup in this example, thus reducing consumption of computing resources and power on each of the smartphones. Additionally, the techniques of this disclosure do not involve initiation of application software unless a device is selected for a connection, whereas previous techniques may have unnecessarily launched an application responsive to establishing a session.

FIG. 1 is a block diagram illustrating a link between a smartphone and a head unit 102. FIG. 1 illustrates smartphone 100, and an automobile head unit 102. Smartphone 100 and automobile head unit 102 are illustrated in FIG. 1 only for the purposes of example, and may comprise any computing device, such as a tablet, laptop, desktop, wearable computing device or any other computing device. As an example, smartphone 100 and head unit 102 may establish communications using Wi-Fi Direct over a communication channel 104. Communication channel 104 may be a wireless channel or a wired communication channel. Examples of wireless communication channels include an IEEE (Institute for Electrical and Electronics Engineers) 802.11 ("Wi-Fi") channel, a Bluetooth™ channel, and an Ultrawideband (UWB) communication channel, as some examples. Examples of a wired channel include USB, Ethernet, and IEEE 1394 (Firewire) communication channels, as some examples.

Smartphone 100 and head unit 102 may transmit audio/video data, control data, and/or display data over communication channel 104 using a variety of protocols. Examples of such protocols may include Internet Protocol (IP), Universal Plug and Play (UPnP), Wi-Fi Display, and/or Virtual Network Computing (VNC), as some examples.

Smartphone 100 may have access to content, various applications and services, and a network, e.g., the Internet and/or a cellular network. Head unit 102 may also include or be coupled to a display, a device for receiving user input, such as a touchscreen, mouse, stylus, or another input device, a speaker, and/or a microphone in various examples. As will be described in greater detail below, in some examples, smartphone 100 and head unit 102 may be configured to: establish a connection with a second computing device, responsive to initiating the connection, perform content discovery with the second computing device, and establish a session of a service responsive to performing content discovery.

Figure 2:
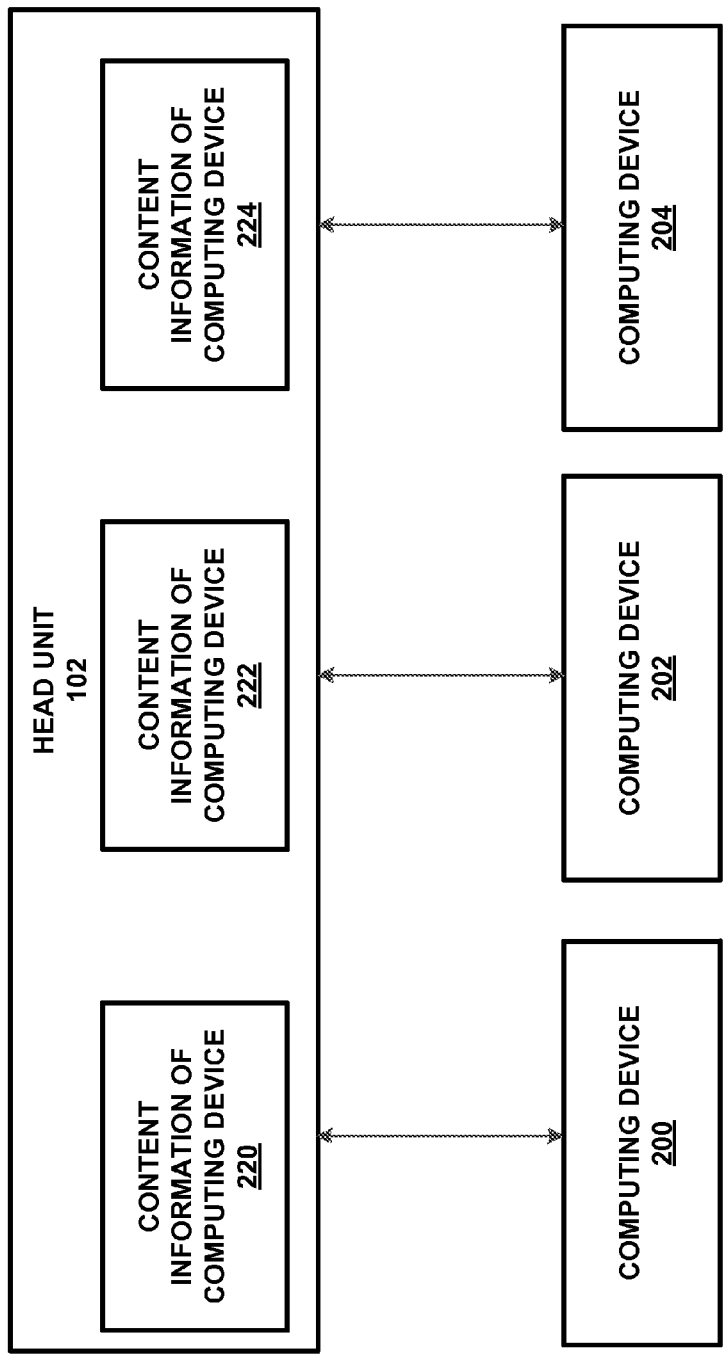
FIG. 2 is a block diagram that illustrates a head unit that is communicatively coupled to a plurality of wireless-enabled computing devices.

FIG. 2 is a block diagram that illustrates a head unit that is communicatively coupled to a plurality of wireless-enabled computing devices. FIG. 2 includes head unit 102. In the example of FIG. 2, head unit 102 is within communication range of computing devices 200, 202, and 204. Computing devices 200 202, and 204 may be smartphones, tablets, laptops, or other wirelessly-enabled computing devices, as some examples.

When computing devices 200, 202, and 204 come within communication range of head unit 102, they may transmit content information to head unit 102. Computing devices 200, 202, and 204 may communicate with head unit 102 using a wireless or wired communication channel, e.g. communication channel 104 as described with respect to FIG. 1.

In one example in accordance with the techniques of this disclosure and illustrated in FIG. 2, head unit 102 may receive content information from each of devices 200, 202, and 204 using MirrorLink™. Head unit 102 may output the content information to a user, e.g. using a display. As an example, head unit 102 may output the content information from computing devices 200, 202, and 204 in one or more lists. The lists may include, file names, track listings, and/or video titles, as some examples. The user may browse these lists using an input device of head unit 102. The user may then provide an indication using the input device to select one of computing devices 200, 202, or 204. Head unit 102 may then associate with the selected one of computing devices 200, 202, or 204.

According to the current MirrorLink™ standard, head unit 102 may not receive the content information until a MirrorLink™ session is established between head unit 102 and one of computing devices 200, 202, or 204. The techniques of this disclosure enable computing devices 200, 202, and 204 and head unit 102 to transmit content information before establishing a MirrorLink™ session and before performing device association, as discussed in greater detail with respect to the figures below. Previous techniques required device association and establishing a MirrorLink™ session before transmitting content information. In accordance with the techniques of this disclosure, head unit 102 may be configured to establish a connection with one of smartphones 200, 202, and 204, e.g., smartphone 200. Head unit 102 may perform content discovery with smartphone 200 responsive to initiating the connection, and establish a session of a service responsive to performing content discovery.

Figure 3:
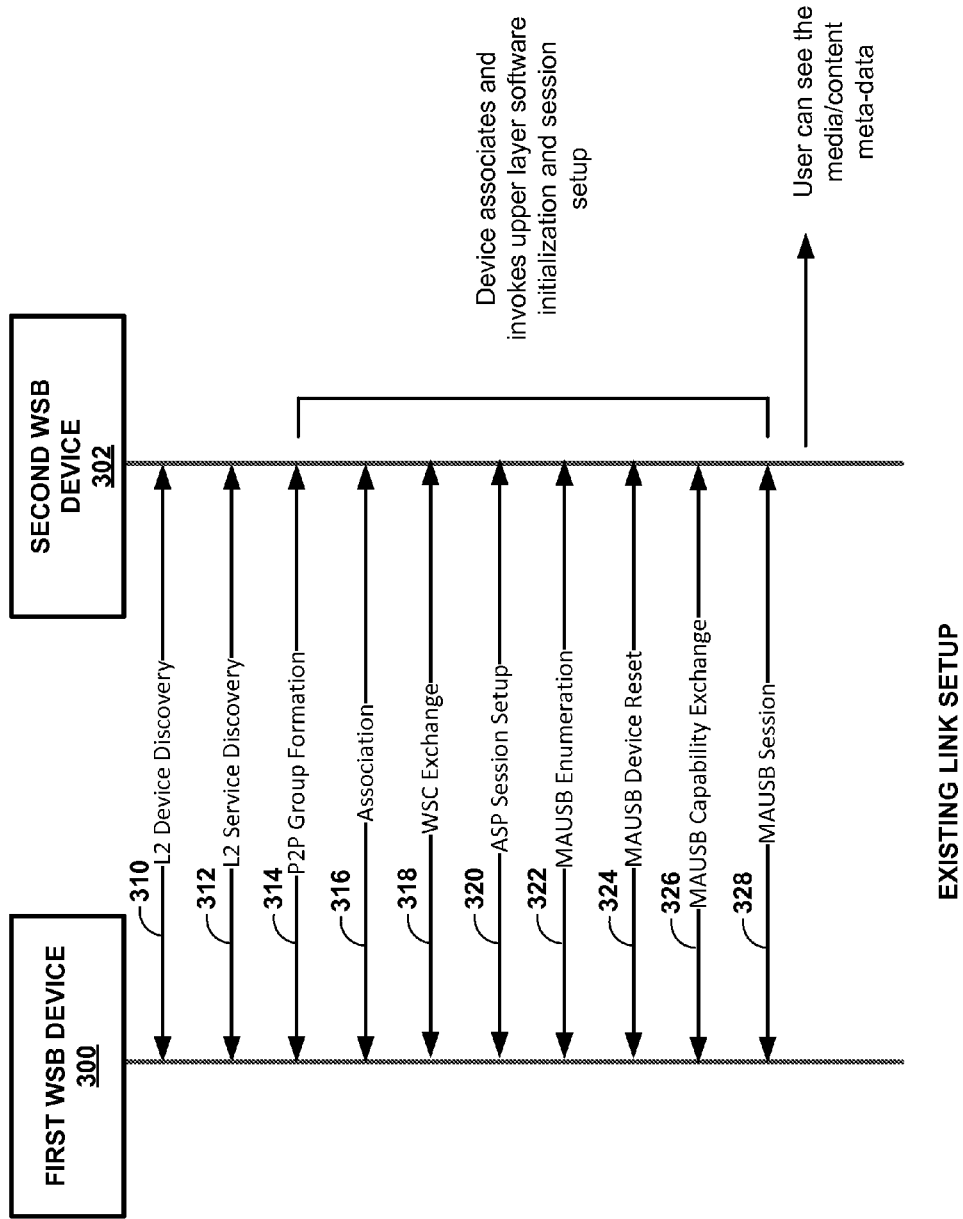
FIG. 3 is a conceptual block and timing diagram illustrating a communication flow between first and second computing devices configured in accordance with the Wi-Fi Direct ASP and WSB standards

FIG. 3 is a conceptual block and timing diagram illustrating a communication flow between first and second computing devices configured in accordance with the Wi-Fi Direct ASP and WSB standards. In FIG. 3, a first WSB device, such as a smartphone, is configured to communicate with a second WSB device 302.

As described above, first WSB device 300 and second WSB device 302 may engage in device discovery and association. First WSB device 300 and second WSB device 302 may use Wi-Fi Direct to perform device discovery (310). After performing device discovery, first WSB device 300 and second WSB device 302 may optionally engage L2 service discovery using WFD (312). As an example, first WSB device 300 may advertise the WSB service or second WSB device 302 may seek the WSB service using WFD. Responsive to the optional WFD service discovery phase, first WSB device 300 and second WSB device 302 may form a peer-to-peer (P2P) group (314), and perform an exchange of credentials to secure the wireless communication session.

Responsive to establishing an ASP session, first WSB device 300 and second WSB device 302 may associate with each other (316), and perform a WSC (Wireless Simple Configuration) capability exchange (318). First WSB device 300 and second WSB device 3012 may then perform application services platform (ASP) session setup (320).

After performing ASP session setup, first WSB device 300 and second WSB device 302 may go through process of MASUSB device enumeration (322), performing an MAUSB device reset (324), and MAUSB capability exchange (326). Responsive to performing the MAUSB capability exchange, first WSB device 300 and second WSB device 302 may establish an MAUSB session (328). Only after establishing the MAUSB can first WSB device 300 and second WSB device 302 share a list of media available at the device to the other device. Thus, FIG. 3 illustrates that first WSB device 300 and second WSB device 302 must perform a lengthy session establishment process before content information related to available media is available to another device.

Figure 4:
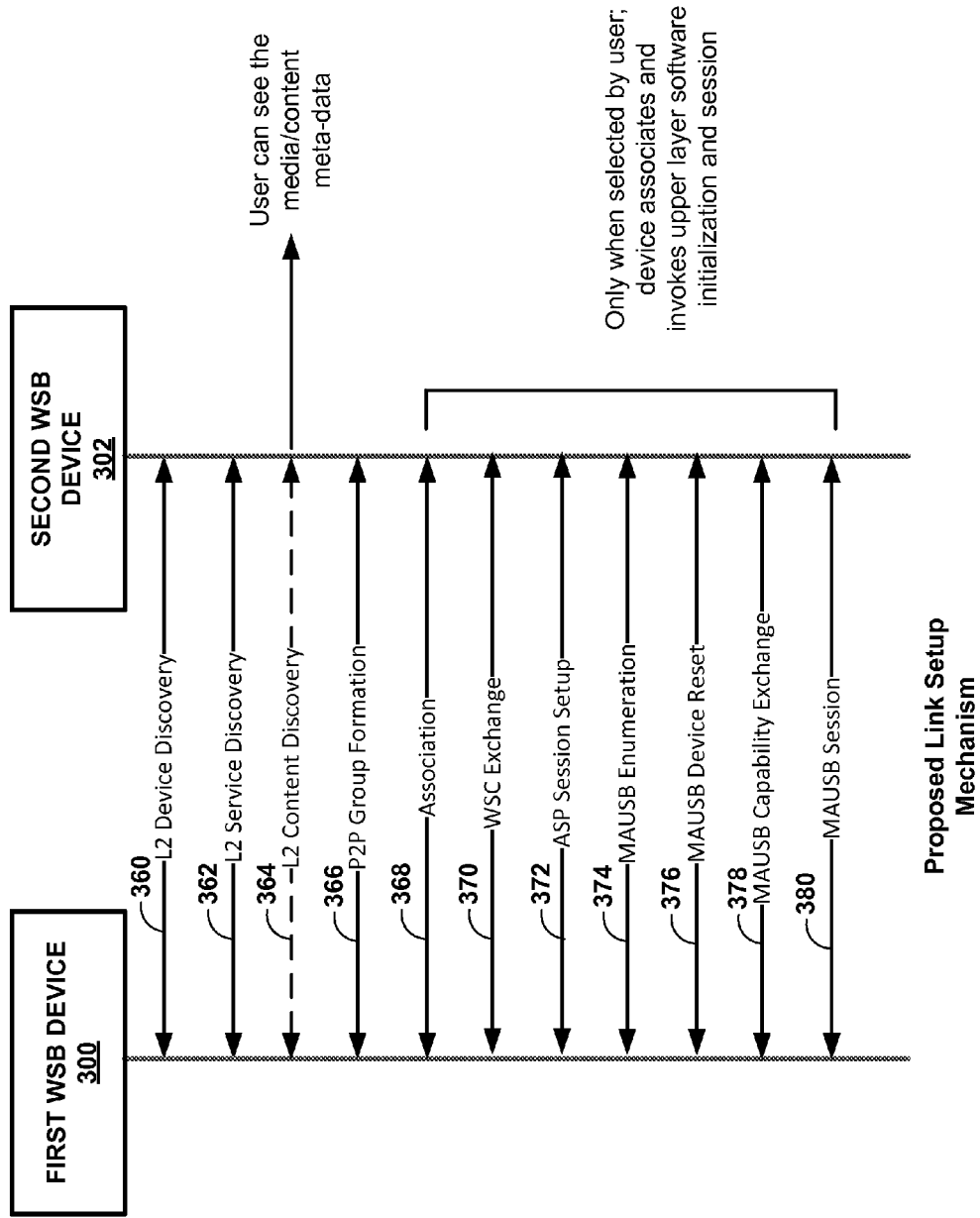
FIG. 4 is a conceptual block and timing diagram illustrating a communication flow between two wireless client devices configured in accordance with the pre-association content discovery techniques of this disclosure.

FIG. 4 is a conceptual block and timing diagram illustrating a communication flow between a wireless client device configured in accordance with the techniques of this disclosure. The flow illustrated in FIG. 4 modifies the standard flow of the Wi-Fi Direct ASP and WSB standards. In FIG. 4, a first WSB device 300, such as smartphone 100 of FIG. 1 or one of computing device 200, 202, or 204 of FIG. 2, is configured to communicate with a second WSB device 302, such as head unit 102 of FIGS. 1-2.

As described above, in accordance with the techniques of this disclosure, first WSB device 300 and second WSB device 302 may engage in L2 device discovery (360), and optional L2 service discovery (362). Responsive to performing steps 360 and 362, first WSB device 300 and second WSB device 302 may perform pre-association content discovery, during which the two devices transmit content information. The pre-association content discovery process is described in greater detail below.

After performing pre-association content discovery, first WSB device 300 and second WSB device 302 may optionally engage L2 service discovery using WFD. After performing device service discovery however, first WSB device 300 and second WSB device 302 may perform pre-association content discovery (364). During pre-association content discovery, first WSB device 300 and second WSB device 302 exchange content information associated with content accessible to first WSB device 300 and/or second WSB device 302.

Whereas in the example according to FIG. 3, content information is not available to second WSB device 302 until after MAUSB session setup completes, in the example of FIG. 4, content information is available before device association, which may allow a device to output the content information to a user or perform other actions based on the content information. After receiving the content information, second WSB device 302 may receive user input indicating a particular computing device with which to establish a particular communication session (e.g., a WSB or MirrorLink™ session).

Responsive to selecting a device with which to associate, second WSB device 302 may perform association (368), WSC exchange (370), and ASP session setup (372). In this example, first WSB device 300 and second WSB device 302 may optionally use an applications services platform (ASP) to establish a session of another protocol, in this case, MAUSB. Responsive to performing the optional ASP session setup 372, first WSB device 300 and second WSB device may perform a MAUSB device reset (376), MAUSB capability exchange (378), and establish a MAUSB session (380).

Thus, in accordance with the techniques of this disclosure, first WSB device 300 and second WSB device 302 may comprise a first computing device and a second computing device, respectively, and vice versa. The first computing device may be configured to: establish a connection with a second computing device, responsive to initiating the connection, perform content discovery with the second computing device, and establish a session of a service responsive to performing content discovery.

FIG. 5 is a table and associated descriptions illustrating content information metadata in accordance with the techniques of this disclosure. FIG. 5 includes table 390, which describes the content information, and more particularly, metadata, which devices configured to perform pre-association content discovery may transmit or receive. The transmitted metadata may represent content or media as an object having properties. The properties may be grouped (clubbed) together into one or more descriptors. Table 390 to the right of FIG. 5 illustrates various example properties of an object, such as a content item.

More specifically, in some examples, the metadata may include a "type" property. The type may indicate a broad category of an object, e.g., whether the object comprises audio, video, an image, calendar data, and/or e-mail. The object may also include a subtype property, which may indicate a file extension, such as MP3, H.264, H.265 or JPEG, as some examples. The object may include a size property, which indicates a size of the object in bytes, as well as duration property, which may indicate the time-length of the object (e.g., in seconds, minutes, etc.). The object may also include a "name" property, which may comprise a human-readable identifier; a protection identifier, which may comprise a human-readable identifier associated with the object. The object may also include a protection property, which may indicate whether the object is read-only, cannot be deleted, or other file permission attributes related to the object. An object may additionally include various video and/or audio related properties, as some examples.

Table 390 lists some additional example properties of an object that may be transmitted during pre-association content discovery. Example properties not already describe include: height, and width, which may refer to properties of a video or picture object; and encoding quality, audio bitdepth, sample rate, audio bitrate, (video) bitrate, a number of channels, and DRM (digital rights management status) which may indicate encoding parameters of an audio video or other media object, as some non-limiting examples.

The properties of table 390 may further include: composer, artist, genre, album name, track, copyright information, subtitle, parental rating, and language properties, which may indicate various properties about an audio or video object. The properties may further include information related to dates and ratings associated with an object, such as a date last accessed property, a date added property, and a rating property. Table 390 of FIG. 5 is merely one example of properties and should not be construed as limiting.

Figure 6:
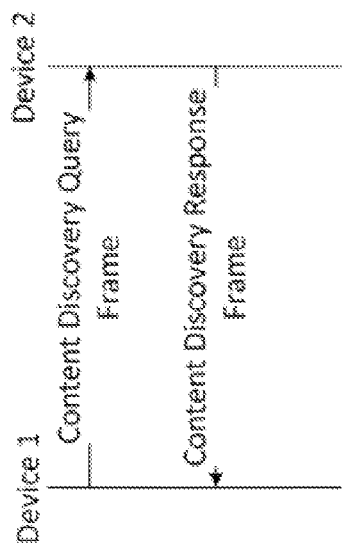
FIG. 6 is a communication timing diagram illustrating a flow for pre-association content discovery in accordance with the techniques of this disclosure.

FIG. 6 is a communication timing illustrating a flow for pre-association content discovery in accordance with the techniques of this disclosure. In the example of FIG. 6, a first device (Device 1) and a second wireless device (Device 2) are configured to engage in pre-association content discovery. To engage in discovery, the first and second devices are configured to transmit a content discovery query message and a content discovery response message. Content discovery query frames and content discovery response frames are GAS (General Advertisement Service) Initial Request Action Frames conforming to the IEEE 802.11u standard. A vendor-specific field of the GAS Initial Response Action Frame contains the content discovery query message or the content discovery response message. Additional details regarding the fields of the content discovery query and content discovery response messages are illustrated in FIGS. 7-9.

Figure 7:
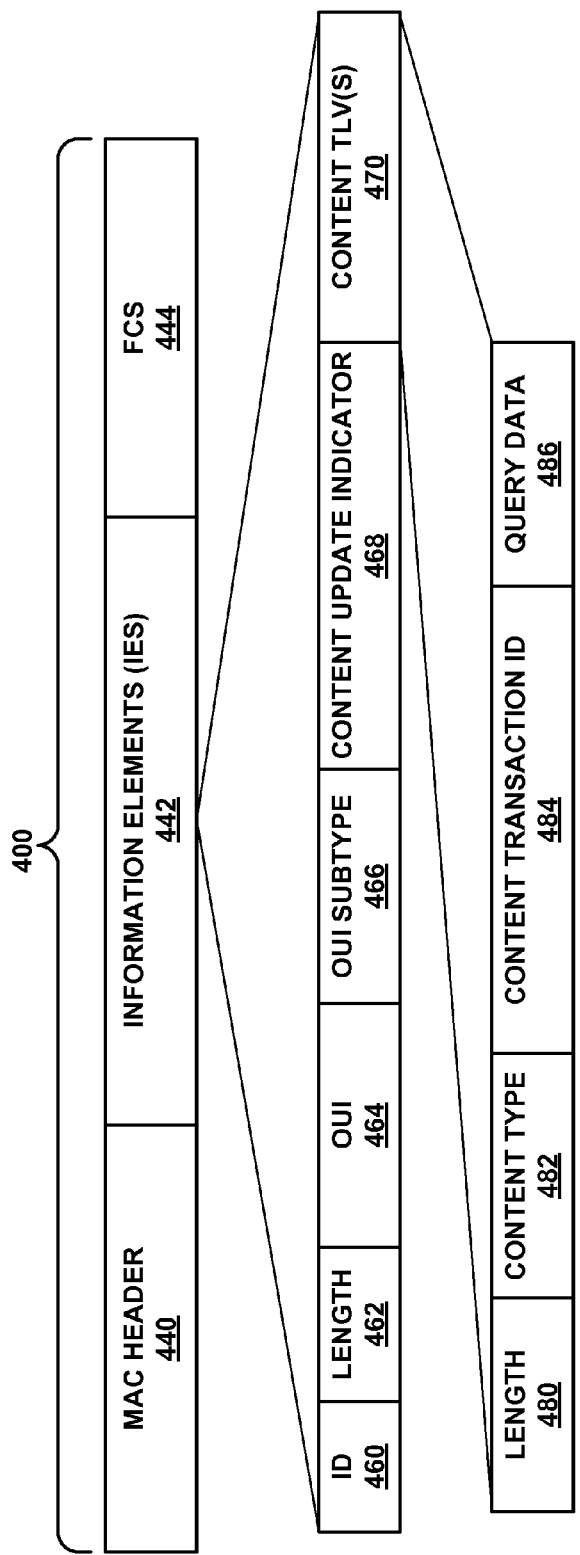
FIG. 7 is a conceptual diagram illustrating an example of a frame that may comprise a content discovery query message or a content discovery response message in accordance with the techniques of this disclosure.

FIG. 7 is a conceptual diagram illustrating an example of a frame that may comprise a content discovery query message or a content discovery response message in accordance with the techniques of this disclosure. FIG. 7 illustrates the general format of an IEEE 802.11u GAS action frame 400 that computing devices, such as head unit 102 computing devices 200, 202, and/or 204 may transmit and/or receive. Management frame 400 includes a machine access code (MAC) header 440, information elements (IEs) 442, and frame check sequence (FCS) 444.

IEs 442 include element ID 460, length 462, and organizational unique identifier (OUI 464). Additionally, content discovery query messages and content discovery response messages may include the following fields: OUI subtype (466), content update indicator (468). In accordance with the techniques of this disclosure, element ID 460 may have hexadecimal value 0xDD, OUI field 464 may have hexadecimal value 0x50-6F-9A, and OUI subtype field 466 may have a hexadecimal value of 0x09. The value of length field 462 may be equal to the sum of the lengths in bytes of OUI field 464, OUI subtype field 466, content update indicator 468, and content TLVs 470.

IEs 442 may also include one or more content type length values (TLVs) (470). TLVs 470 may include a number of additional fields that may be present within IEEE 802.11u frame 400. Each of TLVs 470 includes a length field 480, a content type field 482, a content transaction ID 484, and a query data field 486. Length field 480 indicates the length (in octets) of fields 482, 484, and 486.

In some examples, a content discovery request message or a content discovery response message may include a "Message Type" field. The message type field may comprise a one byte field that follows immediately after the OUI subtype field 466 and before content update indicator field 468. An example of possible Message Type field values and their corresponding meanings is described in Table 1.

TABLE 1

Type Field Values

| Value | Description |
|---|---|
| 0 | Service Discovery Request |
| 1 | Service Discovery Response |
| 2 | Content Discovery Request |
| 3 | Content Discovery Response |
| 4-15 | Reserved |

The values of the type field indicate whether a message is a content discovery request, a content discovery response, a service discovery request, or a service discovery response. Additional details concerning the format of the content discovery query and discovery response messages are described in greater detail with respect to FIGS. 8 and 9 below.

FIGS. 8A, 8B, 8C, and 8D are tables illustrating a more detailed format of a content discovery query message in accordance with the techniques of this disclosure. The content discovery query message of FIGS. 8A-8C may comprise a part of an 802.11u frame, as illustrated with respect to FIG. 7.

FIGS. 8A and 8B comprise fields and corresponding values for a content discovery query message in accordance with the techniques of this disclosure. FIG. 8C comprises content type values that may be included in the content type field of the table of FIG. 8B. The fields and values in FIG. 8B correspond to the fields of a content TLV, as illustrated above with respect to FIG. 7. There may be one or more content TLVs.

As described above, the content discovery query message may comprise an IEEE 802.11u GAS action frame. In some examples, a content discovery query message may comprise an 802.11u management frame that includes a particular OUI (organizational unique identifier), which may be equal to a Wi-Fi alliance OUI, and an OUI subtype value equal to 0x09. The content discovery query message may also include a content update indicator field. The value of the content update indicator field may change (e.g., by a computing device changing the value of the field) in response to content information having been changed. The content discovery query message also includes one or more Content TLVs (type length values). The general structure of a content discovery query message is illustrated in the table of FIG. 8A.

Each content request TLV may include a length field, as well as a content type filed, content transaction ID field, and a query data field. Each content TLV includes information that indicates properties about content items which are queried as part of content discovery query message. As an example, the content type field may include one or more of the values of Table 390 of FIG. 5. Each content type value indicates or requests specific properties about a particular type of content, such as video, audio or another content type.

Each content TLV also includes a query data field. The values of the query data field further define information that is being queried in the content discovery query message. The query data field includes properties, which are described above with respect to table 390. As an example, one content TLV may include a content type value of "1." corresponding to audio. The corresponding query data field for that TLV may indicate properties, such as property number 2, corresponding to the subtype extension to indicate that information regarding the subtype of the audio files is being requested in the content discovery query message. The content request TLV also includes a content Transaction ID. The Content Transaction ID field may be a non-zero identifier value that is used to match one or more corresponding content discovery request messages with one or more corresponding content discovery response messages.

FIG. 8D illustrates another example of a table comprising fields and corresponding values for a content request TLV in accordance with the techniques of this disclosure. In the example of FIG. 8D, a transmitting device may include one of the values of FIG. 8D in the content type field of FIG. 8B. Values 0-11 may correspond to other protocols not relevant to pre-association content discovery. Values 12-17 may correspond to specific content discovery types, similar to those illustrated in FIG. 8C. A device that receives a content discovery query message having the TLV format of FIG. 8D responds with TLVs that conform to table 8D in its content discovery response message.

FIGS. 9A, 9B, 9C and 9D are tables illustrating fields and corresponding values for a content discovery response message in accordance with the techniques of this disclosure. As described above, a content discovery response conforms to the IEEE 802.11u GAS action frame standard, as described above with respect to FIG. 7. A computing device may transmit a content discovery response message responsive to receiving a content discovery query frame.

FIGS. 9A and 9B are table comprising fields and corresponding values for a content discovery response message in accordance with the techniques of this disclosure. The table of FIG. 9D comprises content type values that may be included in the content type field of the table of FIG. 9B. In some examples, the content type field of FIG. 9B may comprise values corresponding to FIG. 8D. FIG. 9D is identical to FIG. 8C. FIG. 9C is a table comprising status code values that may be included in the query data field of the table of FIG. 9B. The fields and values in FIG. 9B comprise the fields of a content TLV of the content discovery response message, as illustrated above with respect to FIG. 7. A content discovery response message may include one or more content TLVs. Each of the TLVs of the content discovery response message may correspond to each of the TLVs in a received content discovery query message.

With respect to FIG. 9A, each content discovery query message includes an OUI subtype field, a content update indicator field, and one or more content TLVs. The OUT subtype field of FIG. 9A has a value equal to 0x09, which is equal to an WFA OUI subtype value. The value of the content update indicator field may change (e.g., by a computing device changing the content indicator value) in response to content information having been changed. Thus, if media accessible to a device has changed since a previous pre-association content discovery exchange, a device may change this value to indicate the changed content.

As illustrated in FIG. 9B, a Content TLV A content response TLV may include a length field, as well as a content type field, content transaction ID field, status code field, and a response data field. Each content TLV corresponds to a content TLV included in a content discovery query message.

The content type field may include one or more of the values of FIG. 9D. The Content Transaction ID may be a non-zero value that is used to match a corresponding content transaction ID from a TLV of a content discovery request message. The status code may indicate a status for the requested content information. For example, the status code may indicate whether there was success in requesting content, whether the content or requested information was unavailable, or whether there was a bad request. Status code values are illustrated in FIG. 9C.

The values of the response data field are correspond to the properties (if any) included in in the Query Data field of a content discovery query message. As an example, if a content discovery query message includes the subtype property in a TLV, a device transmitting a corresponding content discovery response message would include a content TLV having the subtype value. The response data field would further include information related to each content item that matches the content type (if any, e.g., audio) indicated in the content discovery query message. There may be more than one property type (e.g., filename, and date added) included in the response data field of a content response TLV in various examples.

Figure 10:
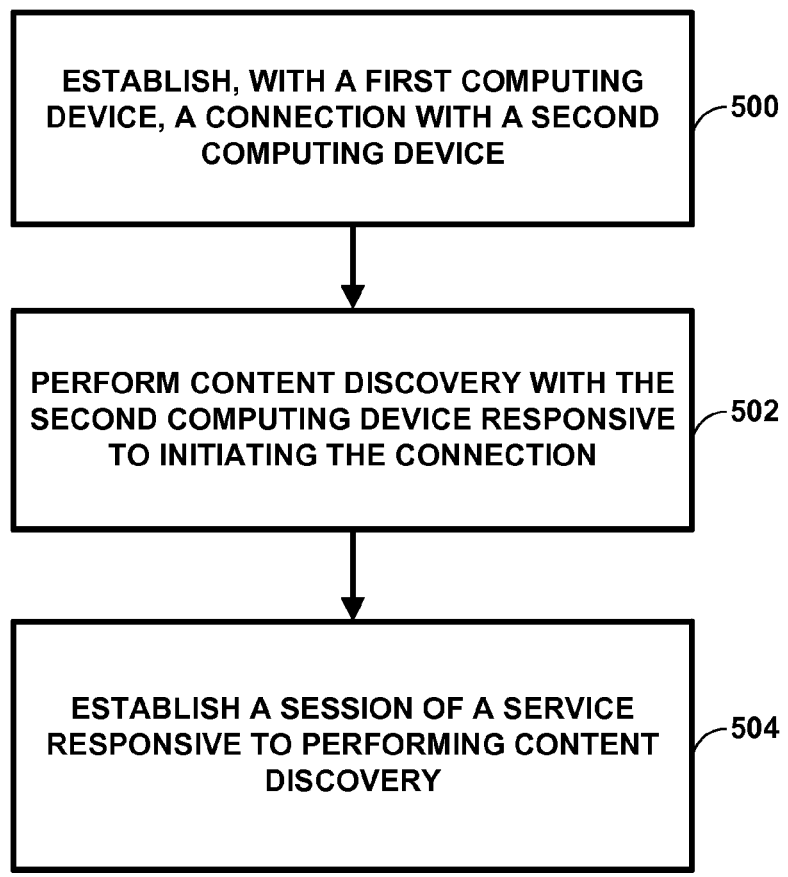
FIG. 10 is a flowchart illustrating a method for performing pre-association content discovery in accordance with the techniques of this disclosure.

FIG. 10 is a flowchart illustrating an example method for performing pre-association content discovery in accordance with the techniques of this disclosure. For the purposes of example, it should be understood that a computing device, such as head unit 102, smartphone 100 of FIG. 1, or any of smartphones 200, 202, or 204 may perform the techniques illustrated in FIG. 10.

In accordance with the techniques of this disclosure, a computing device, such as smartphone 100 may be configured to establish, to a second computing device, for example to head unit 102, a connection with the second computing device (500).

Smartphone 100 may be further configured to perform content discovery with head unit 102 responsive to initiating the connection (502), and establish a session of a service responsive to performing content discovery (504). In some examples, the content discovery may be performed at a layer 2 (L2) open systems interconnection (OSI) model level.

In some examples, to perform content discovery, smartphone 100 may be further configured to transmit or receive data associated with content accessible to the first computing device. In another example, the connection may be a wireless connection, and smartphone 100 may establish the connection using Wi-Fi Direct (WFD). In some examples, the connection may be a wireless connection, and the connection may be established by smartphone 100 using Wi-Fi Direct (WFD).

In another example, to perform content discovery, smartphone 100 may be further configured to transmit an institute of electrical and electronics engineers (IEEE) 802.11 frame comprising a content discovery request message or a content discovery response message. The 802.11 frame may include type at least one type length value (TLV) that describes at least one content item accessible to smartphone 100 or head unit 102.

In another example, to perform content discovery, smartphone 100 may be further configured to: responsive to receiving the content discovery query message, transmit the content discovery response message to head unit 102. The content discovery response message may include content information for at least one content item indicated in the content discovery response message.

In another example, to perform content discovery, smartphone 100 may be further configured to: transmit information associated with a content item accessible to the first computing device or the second computing device, wherein the information associated with the content item comprises at least one of a group consisting of: a filename, a file extension, a file size, a duration, a file protection, and a file category.

In some examples the first computing device may comprise head unit 102 instead of smartphone 100, and the second computing device may comprise smartphone 100. In these examples, to perform content discovery, head unit 102 may be further configured to receive content information, from smartphone 100 and a third computing device. Head unit 102 may also be configured to receive a user input selection of either the second computing device or the third computing device, and responsive to receiving the selection, establish a service session with the selected smartphone 100 or third computing device.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. In some examples, computer-readable media may comprise non-transitory computer-readable media. Data storage media may be any available media that can be accessed by one or more computers or one or more processors to retrieve instructions, code and/or data structures for implementation of the techniques described in this disclosure.

By way of example, and not limitation, such computer-readable media can comprise non-transitory media such as RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Also, any connection is properly termed a computer-readable medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Example vehicles that can employ techniques of this disclosure include automobiles, watercrafts, aircrafts, all-terrain vehicles (ATV's), and tanks or other military vehicles, semi-trucks or other transportation vehicles, and bulldozers, tractors, or other heavy machinery, and trains, golf carts, and other types of vehicles. A wide variety of vehicle data and processing of such data is contemplated in examples according to this disclosure.

Various embodiments of the invention have been described. These and other embodiments are within the scope of the following claims.

What is claimed is:

1. A method of communicating data, the method comprising:
   establishing a connection between a first computing device and a second computing device;
   performing, by the first computing device and the second computing device, service discovery;
   performing, by the first computing device and the second computing device, content discovery before performing device association, wherein performing content discovery includes at least one of: receiving, by the first computing device from the second computing device, content information associated with a content item accessible to the second computing device, or transmitting, by the second computing device to the first computing device, the content information associated with the content item accessible to the second computing device, wherein the content item includes a file, an audio file, or a video file; and establishing a session of a service after performing content discovery.

2. The method of claim 1, wherein performing content discovery includes at least one of:
receiving, by the second computing device from the first computing device, content information associated with a content item accessible to the first computing device, or transmitting, by the first computing device to the second computing device, the content information associated with the content item accessible to the first computing device.

3. The method of claim 1, wherein the connection is a wireless connection, and wherein establishing the connection comprises establishing the connection using Wi-Fi Direct (WFD).

4. The method of claim 1, wherein performing content discovery comprises:
transmitting, by the first computing device to the second computing device, a content discovery query message, wherein the content discovery query message includes at least one type length value (TLV) that describes at least one property of at least one content item; and transmitting, by the second computing device to the first computing device, a content discovery response message, wherein the content discovery response message includes at least one type length value (TLV) that describes at least one content item accessible to the second computing device that corresponds to the least one property described in the content discovery query message.

5. The method of claim 1, wherein performing content discovery further comprises:
responsive to receiving, by the second computing device, a content discovery query message, transmitting, by the second computing device to the first computing device, a content discovery response message, wherein the content discovery response message includes content information for at least one content item described in the content discovery query message.

6. The method of claim 1, wherein performing content discovery comprises:
transmitting, by the second computing device to the first computing device, the content information associated with the content item accessible to second computing device, wherein the content information associated with the content item comprises at least one of a group consisting of:
a filename, a file extension, a file size, a duration, a file protection, and a file category.

7. The method of claim 1, wherein the first computing device is a head unit of an infotainment system.

8. The method of claim 7, wherein performing content discovery further comprises:
receiving, by the head unit, content information associated with the content item accessible to the second computing device, from the second computing device; and receiving, by the head unit, content information associated with a content item accessible to a third computing device from the third computing device.

9. The method of claim 8, further comprising:
receiving, by the head unit, a user input selection of either the second computing device or the third computing device; and responsive to receiving the selection, establishing the session of the service with the selected second computing device or third computing device.

10. The method of claim 1, wherein performing the content discovery comprises performing the content discovery at a layer 2 (L2) open systems interconnection (OSI) model level.

11. A first computing device comprising:
a memory storing instructions; and
at least one processor, wherein the at least one processor is configured to:
establish a connection with a second computing device;
perform service discovery with the second computing device;
perform content discovery with the second computing device before performing device association, wherein to perform content discovery, the at least one processor is configured to receive, from the second computing device, content information associated with a content item accessible to the second computing device, wherein the content item includes a file, an audio file, or a video file; and
establish a session of a service after performing content discovery.

12. The first computing device of claim 11, wherein to perform content discovery, the at least one processor is configured to transmit content information associated with a content item accessible to the first computing device.

13. The first computing device of claim 11, wherein the connection is a wireless connection, and wherein the connection is established the using Wi-Fi Direct (WFD).

14. The first computing device of claim 11, wherein to perform content discovery, the at least one processor is further configured to transmit a content discovery query message, wherein the content discovery query message includes at least one type length value (TLV) that describes at least one property of at least one content item.

15. The first computing device of claim 11, wherein the content information associated with the content item comprises at least one of a group consisting of:
a filename, a file extension, a file size, a duration, a file protection, and a file category.

16. The first computing device of claim 11, wherein the first computing device is a head unit of an infotainment system.

17. The first computing device of claim 16, wherein to perform content discovery, the at least one processor is further configured to:
receive content information associated with the content item accessible to the second computing device from the second computing device; and receive content information associated with a content item accessible to a third computing device from the third computing device.

18. The first computing device of claim 17, wherein the at least one processor is further configured to:
receive a user input selection of either the second computing device or the third computing device; and responsive to receiving the selection, establish the session of the service with the selected second computing device or third computing device.

19. The first computing device of claim 11, wherein the content discovery is performed at a layer 2 (L2) open systems interconnection (OSI) model level.

20. A first computing device comprising:
    means for establishing a connection with a second computing device;
    means for performing service discovery with the second computing device;
    means for performing content discovery with the second computing device before performing device association, wherein the means for performing content discovery comprises means for receiving, from the second computing device, content information associated with a content item accessible to the second computing device, wherein the content item includes a file, an audio file, or a video file; and
    means for establishing a session of a service after performing content discovery.

21. The first computing device of claim 20, wherein the means for performing content discovery comprises means for transmitting content information associated with a content item accessible to the first computing device.

22. The first computing device of claim 20, wherein the connection is a wireless connection, and wherein establishing the connection comprises establishing the connection using Wi-Fi Direct (WFD).

23. The first computing device of claim 20, wherein the means for performing content discovery comprises means for transmitting a content discovery query message, wherein the content discovery query message includes at least one type length value (TLV) that describes at least one property of at least one content item.

24. The first computing device of claim 20, wherein the content information associated with the content item comprises at least one of a group consisting of:
    a filename, a file extension, a file size, a duration, a file protection, and a file category.

25. The first computing device of claim 20, wherein the first computing device is a head unit of an infotainment system.

26. The first computing device of claim 25, wherein the means for performing content discovery further comprises:
    means for receiving content information associated with the content item accessible to the second computing device, from the second computing device; and
    means for receiving content information associated with a content item accessible to a third computing device from the third computing device.

27. The first computing device of claim 26, further comprising:
    means for receiving, a user input selection of either the second computing device or the third computing device; and
    means for establishing the session of the service with the selected second computing device or third computing device responsive to receiving the selection.

28. A non-transitory computer-readable medium having stored thereon instructions that, when executed, cause at least one processor of a first computing device to:
    establish a connection with a second computing device;
    perform service discovery with the second computing device;
    perform content discovery with the second computing device before performing device association, wherein the instructions that, when executed, cause the at least one processor of the first computing device to perform content discovery comprise instructions that, when executed, cause the at least one processor to receive, from the second computing device, content information associated with a content item accessible to the second computing device, wherein the content item includes a file, an audio file, or a video file; and
    establish a session of a service responsive to performing content discovery.

* * * * *